(12) United States Patent
Cheung et al.

(10) Patent No.: US 7,917,288 B2
(45) Date of Patent: Mar. 29, 2011

(54) ABBREVIATED DIRECTIONS FOR ROUTE NAVIGATION

(75) Inventors: Matthew Cheung, Redmond, WA (US); Jeffrey D Couckuyt, Bothell, WA (US); Wayne Liu, Kirkland, WA (US); Anne Loomis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 11/870,918

(22) Filed: Oct. 11, 2007

(65) Prior Publication Data

US 2009/0099769 A1    Apr. 16, 2009

(51) Int. Cl.
    *G01C 21/30* (2006.01)
(52) U.S. Cl. .................................. 701/209; 340/990
(58) Field of Classification Search .................. 701/201, 701/200, 209; 340/988, 990
    See application file for complete search history.

(56) References Cited

U.S. PATENT DOCUMENTS

| | | | | |
|---|---|---|---|---|
| 5,528,501 | A * | 6/1996 | Hanson | 701/200 |
| 6,038,559 | A * | 3/2000 | Ashby et al. | 707/4 |
| 6,477,460 | B2 | 11/2002 | Kepler | |
| 6,490,522 | B2 | 12/2002 | Sugiyama et al. | |
| 6,507,850 | B1 * | 1/2003 | Livshutz et al. | 707/104.1 |
| 6,975,940 | B1 | 12/2005 | Childs et al. | |
| 7,054,745 | B1 | 5/2006 | Couckuyt et al. | |
| 7,395,153 | B1 * | 7/2008 | Nesbitt et al. | 701/210 |
| 7,561,965 | B1 * | 7/2009 | Nesbitt et al. | 701/210 |
| 2007/0013551 | A1 | 1/2007 | Gueziec | |
| 2007/0088500 | A1 | 4/2007 | Spinelli | |
| 2007/0198182 | A1 | 8/2007 | Singh | |

FOREIGN PATENT DOCUMENTS

WO    WO9957516 A1    11/1999

OTHER PUBLICATIONS

Collier, "In-vehicle Route Guidance Systems Using Map-Matched Dead Reckoning", Position Location and Navigation Symposium, Mar. 20-23, 1990, IEEE, 1990, pp. 359-363.
Klippel, et al., "Pictorial Representations of Routes: Chunking Route Segments during Comprehension",Spatial Cognition III. vol. 2685, Springer-Verlag Berlin Heidelberg , 2003, pp. 11-33.
Herman, "Benefits of a Bi-directional Route System", pp. 1-11.
"New York State Thruway Route System", retrieved on Sep. 14, 2007 at <<http://www.nysgis.state.ny.us/gisdata/metadata/nysta.nythruway.htm>>, pp. 1-13.

* cited by examiner

*Primary Examiner* — Mark Hellner

(57) ABSTRACT

A geographic navigation system for segmenting a received set of instructions (or directions) that guide a user over a geographic route from a starting location to an ending location, and then abbreviating a subset of the instructions related to the inexact or familiar regions into a more concise and relevant form, yet retain all the information for guiding the user on the trip. Route segmentation occurs before instruction abbreviation by segmenting the route into multiple logical components in which abbreviation can be applied. After the need for instruction abbreviation is recognized and the route is segmented, techniques and designs are employed to generate understandable strings that describe the abbreviated directions as well as controls that allow optimization of the user experience.

20 Claims, 11 Drawing Sheets

ABBREVIATED DIRECTIONS FOR ROUTE NAVIGATION

BACKGROUND

There are numerous products and services that provide users with directions from one geographic location to another. These typically generate a complete list of turn-by-turn instructions from the specified origin to a destination, and oftentimes, the instructions are accompanied by a map. The list of instructions is functional, but frequently results in generated instruction sets that include more steps and information than necessary, and that needs to be represented in more physical space (e.g., webpage, device display, printed paper, etc.) thereby requiring more pages. Moreover, this extra unnecessary information makes the directions harder to interpret by the user and causes frustration at least with respect to taking this information on paper because of wasted ink, paper, and time.

A significant percentage of requested directions at least partially contain a section that is familiar to the requester, for example, a section of route instructions near the beginning or end of the list for a home or work location. Furthermore, in many instances the instructions (e.g., approximately one-third) returned specify an inexact origin or destination, such as a postal code or a city. Under both of these situations, a complete set of turn-by-turn instructions from the exact origin to the destination is not necessary and wasteful in both processing and user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture operates in support of a geographic navigation system to provide a way for segmenting a set of instructions (or directions) that guide a user over a geographic route from a starting location to an ending location, and then abbreviating a subset of the instructions related to the inexact or familiar regions into a more concise and relevant form, yet retain all the information for guiding the user on the trip. The set of instructions can include only the starting location and the ending location, a complete set of instructions (e.g., starting location, ending location and instructions for routes inbetween) or a partial set.

The architecture includes a decision component for recognizing situations where abbreviated directions are helpful, and when abbreviated directions are not to be employed. In other words, there are specific situations where abbreviated directions are more suitable than traditional full turn-by-turn instructions.

Route segmentation occurs before instruction abbreviation by segmenting the route into multiple logical components in which abbreviation can be applied. Specific techniques for route segmentation which makes abbreviation possible are described.

After the ability for instruction abbreviation is recognized and the route is segmented, techniques and designs (e.g., in the user interface) are employed to generate understandable strings that describe the abbreviated directions as well as controls that allow optimization of the user experience.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
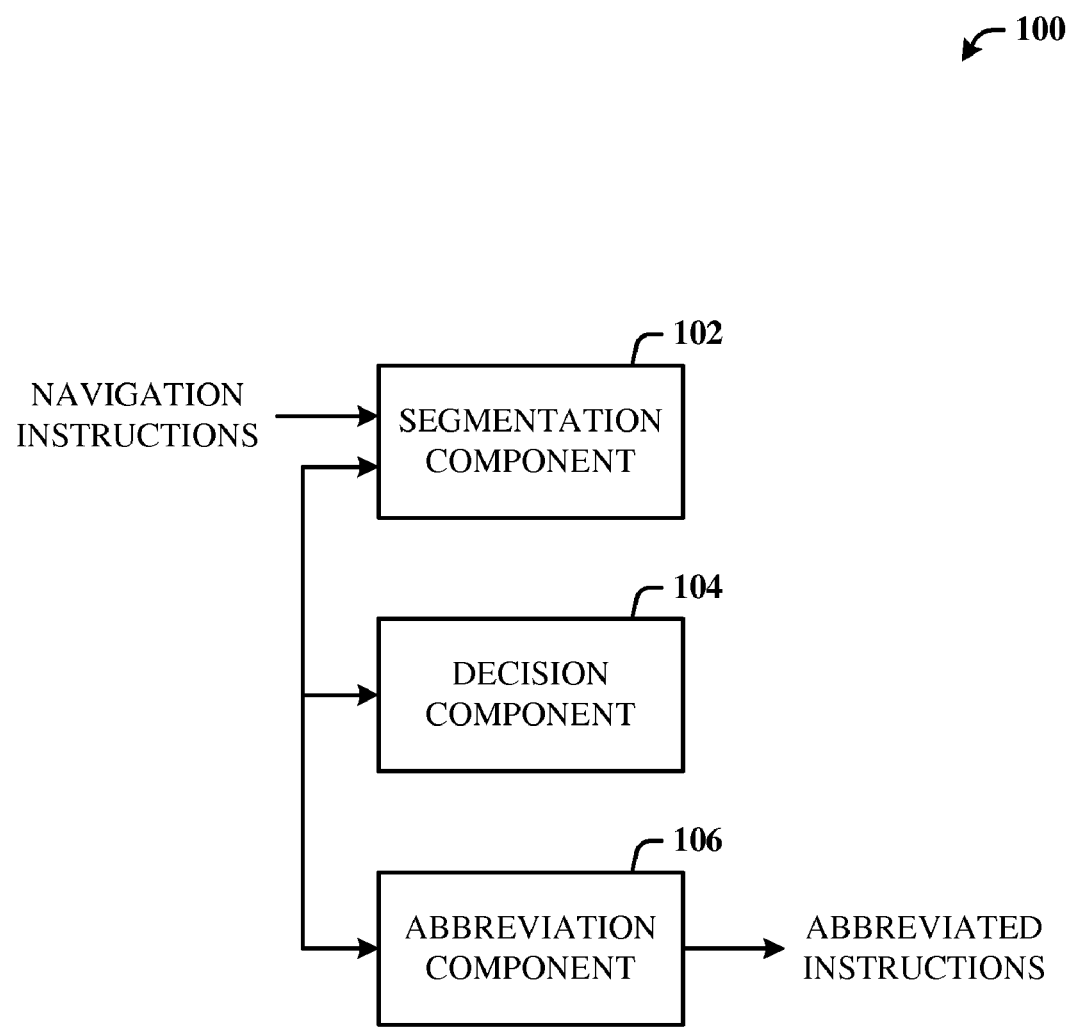
FIG. 1 illustrates a computer-implemented navigation system for abbreviating route instructions.

The disclosed architecture is a geographical mapping solution that takes as input information that defines endpoints such as a starting location and an ending location between which a user desires to navigate and/or a set of instructions (or directions) more than the starting location and the ending location that guide a user from the starting location to the ending location over a route (e.g., via highways and streets) defined by these instructions. For example, one or both of the endpoints can be abbreviated where the route search is optimized based on these endpoints (e.g., stop searching when an edge of a city is reached rather than searching the road grids to the city centroid, etc.)

The instructions can be grouped into logical groupings for abbreviation processing to reduce the number of instructions so that the overall set is more user-friendly. Abbreviated direction sets are not always more suitable than the traditional full set of directions. There are specific situations where abbreviated directions are likely to be preferred and these situations are identified such that the appropriate considerations can be made in generating and presenting the abbreviated directions to the user. Abbreviation of the segmented instructions can be performed using heuristics to summarize or abbreviate one or more segments to make the overall direction set more concise. Additionally, the presentation can be determined by the suitability of abbreviated directions based on the situation at hand.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented navigation system 100 for abbreviating route instructions. The system 100 includes a segmentation component 102 for grouping instructions into multiple segments. The instructions provide a route for navigating geographically from a starting location (e.g., home) to an ending location (e.g., work). The methods for segmenting the route are described below. A decision component 104 receives and processes one or more factors to determine suitability for abbreviating the instructions of a segment. An abbreviation component 106 then abbreviates the instructions of the segment based on the one or more factors. Note that although the description herein is in the context of receiving a set of instructions as input, it is understood that the input can be the information related to the endpoints (e.g., starting location and ending location) or the combination, as well.

There can be a number of factors that affect the suitability of the abbreviated instructions, including, but not limited to, local transportation topology, a user's familiarity or likely familiarity with the region, length of the route, route complexity and route characteristics, and characteristics of the starting location, ending location and waypoints along the route.

Figure 2:
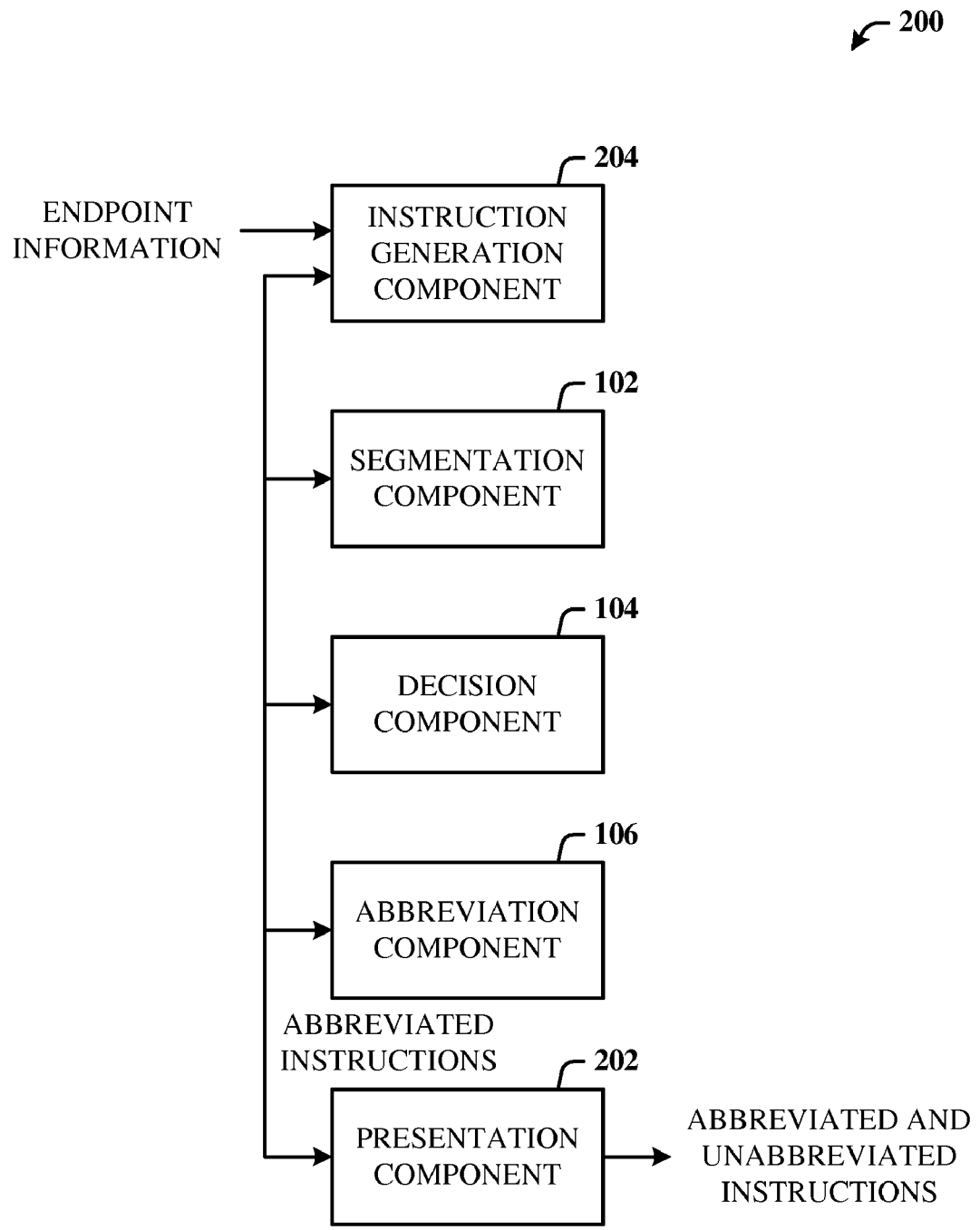
FIG. 2 illustrates a system for presenting abbreviated instructions for navigating a route.

FIG. 2 illustrates a system 200 for presenting abbreviated instructions for navigating a route. The system 200 includes the segmentation component 102, decision component 104 and abbreviation component 106 of FIG. 1 for generating the abbreviated instructions. Additionally, the system 200 includes a presentation component 202 for presenting understandable strings that describe the abbreviated instructions and controls that allow optimization of the user experience for navigating from the starting location to the ending location. The presentation component 202 presents the entire set of abbreviated and unabbreviated instructions to the user for viewing and/or printing. A map can also be presented in combination with the entire set of instructions.

The system 100 operates to receive the information and/or instruction set and then decides if abbreviation is to be performed. In an alternative implementation, in the system 200, the decision to abbreviate can be predetermined before instruction generation such that the desire to abbreviate influences the generation of the instruction set via an instruction generation component 204. The instruction generation component 204 receives the endpoint information (e.g., starting location and ending location) and will generate the instruction set therefrom. For example, the fact that abbreviation is known before instruction generation can influence the search processing operations for the roads (routes) to the ending point. Factors about the user, for example, can indicate that the user knows the region sufficiently well such that abbreviation exists for most routes instead for those areas or regions identified where the user geographical knowledge may be weak.

Figure 3:
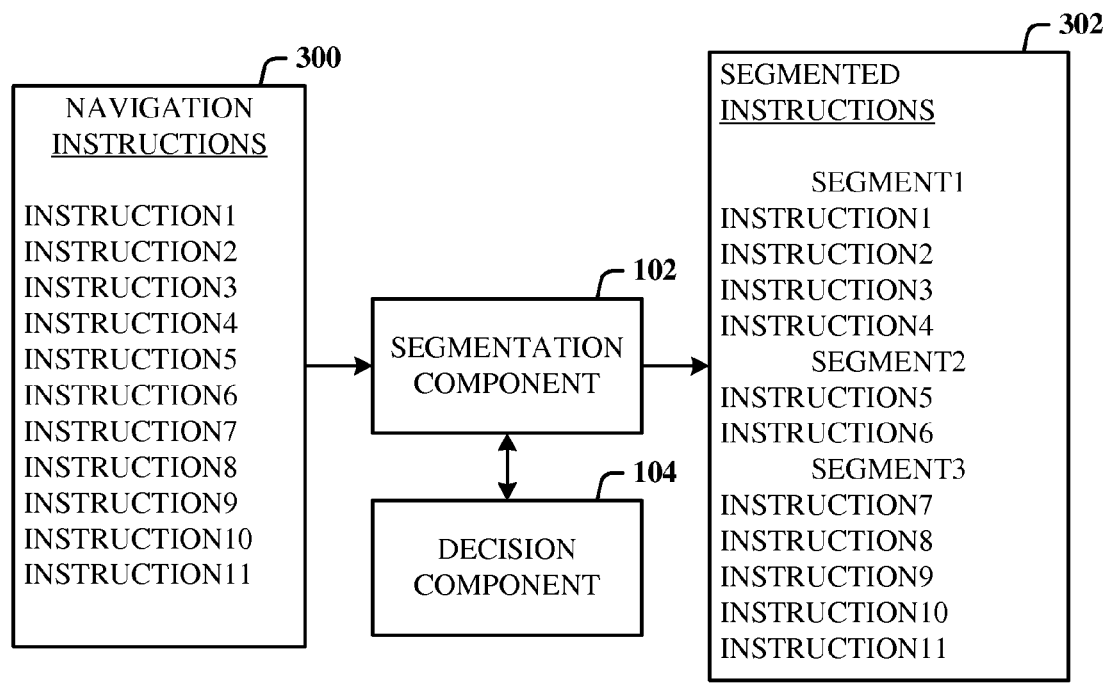
FIG. 3 illustrates exemplary segmentation of navigation instructions for abbreviation processing.

FIG. 3 illustrates exemplary segmentation of navigation instructions 300 for abbreviation processing. In this example, the navigation instructions 300 include nine unabbreviated instructions that define directions for navigating a route. The instructions are received into the segmentation component 102 and segmented by the decision component 104 processing the suitability factors. The ability to segment a route into logical groups is what makes abbreviated instructions (or directions) possible. Once segmentation is complete, one or more of the factors described herein can be used to determine which segments to abbreviate.

The route can be segmented into N segments, where each segment represents a particular logical type of transportation system. The definition of these transportation systems can vary depending on the type of route and culture. For example, in North America, driving directions can be based on highways versus surface streets.

In a specific implementation, a route is segmented into a starting segment (Segment1) having Instructions 1-2, a middle segment (Segment2) having Instructions3-6, and an ending segment (Segment3) having Instructions7-9. This is accomplished by analyzing the route (as defined by the unabbreviated instructions) 300 and first identifying the middle segment. Instructions that are listed before the middle segment are considered the starting segment and instructions after the middle segment are considered the ending segment. The middle segment can be primarily identified by looking for a continuous sequence of instructions that take the user on limited access highways over a significant part of the route. If no limited access highways are present, then the middle segment can also be secondarily identified by looking for route segments that remain on the same roadway for a significant part of the route.

The following example illustrates abbreviation with a starting location of "1 Microsoft Way" to an ending location of "100 S Main Street Seattle, Wash.".

| Step | Instruction | Distance (mi) |
|------|-------------|---------------|
| 1 | Depart 157th Ave NE/Microsoft Way | N/A |
| 2 | Turn right onto NE 36th St | 0.1 |
| 3 | Turn right onto 156th Ave NE | 0.2 |
| 4 | Turn left onto NE 40th St | 0.2 |
| 5 | Take ramp left and follow signs for SR-520 West | 9.8 |
| 6 | Take ramp left for I-5 South toward Portland | 2.5 |
| 7 | At exit 165A, take ramp right for 6th Ave toward James St | 0.4 |
| 8 | Turn right onto Columbia St | 0.3 |
| 9 | Turn left onto 1st Ave | 0.1 |
| 10 | Road name changes to 1st Ave | 0.1 |
| 11 | Arrive at 100 S Main St, Seattle, WA | N/A |

Using the above algorithm, it can be determined that Step 5 and 6 (Instructions 5 and 6) are continuous segments that are traveled on limited access highways and include a significant portion of the overall route. Thus, Step 5 and 6 are considered the middle segment, Step 1-4 (Instructions 1-4) are considered the starting segment and Step 7-11 (Instructions 7-11) are considered the ending segment. This represents a general process of instruction segmentation, and can be extended to systems with more than three segments and/or other transportation system types and segmentation criteria.

It is possible that a route cannot be segmented according to the predetermined criteria. In such a situation, abbreviated directions will not be generated.

Figure 4:
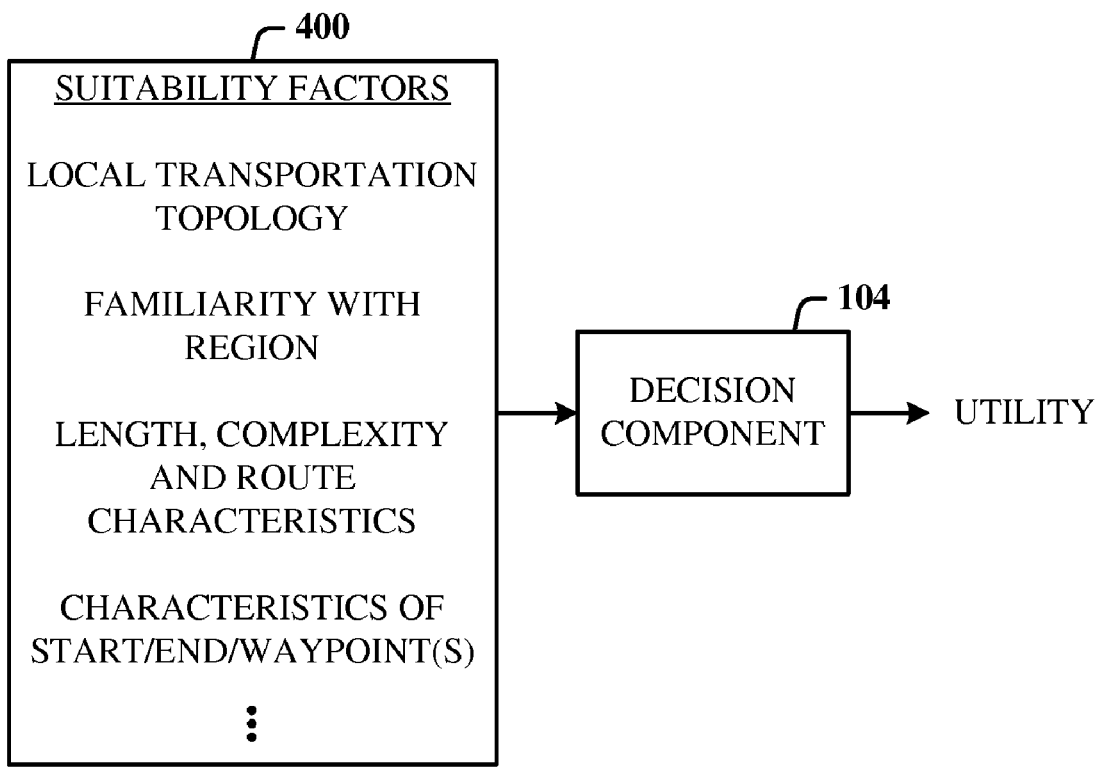
FIG. 4 illustrates the use of suitability factors for determining if abbreviation is to be performed.

FIG. 4 illustrates the use of suitability factors 400 for determining if abbreviation is to be performed. There are a number of factors 400 that when processed by the decision component 104 affect the suitability of abbreviated directions. These factors can be considered separately or in combination to determine the overall value (or utility) of abbreviated instructions and has an impact on whether abbreviation instructions will be generated and how the abbreviation instructions will be presented.

One factor includes the local transportation topology. Abbreviated directions function in general by segmenting the overall route into logical groupings. Depending on the mode of transport, locality and culture, it may or may not be possible (or desirable) to segment the routes into these logical pieces. The ability to do so is a factor in determining if abbreviated directions are suitable (or possible) at all. Consider an example of driving directions in North America; one logical grouping that can be used is highways and surface streets. A route will be considered more suitable for abbreviation if the route can be broken up into such logical segments. On the other hand, if a route consists entirely of travel on surface streets, then abbreviation will have lower value or impossible.

Another factor includes the user's likely familiarity of the region in which the route is traveled. A goal of abbreviated directions is to reduce unnecessary route details. Thus, the user's level of familiarity with a portion of the route to be abbreviated is used to decide whether to abbreviate a segment of instructions, when to abbreviate, and which part of the route to abbreviate. This can be inferred by the user's history of travel. For example, if a user has requested directions in an area multiple times in the past, this activity can be inferred as a trigger for increased familiarity.

Inferences can also be made about the user's saved locations. In some applications, a user can manually save certain locations to be recalled later. Common location examples include home and work. If an instruction set starts or ends near these regions, this can be inferred as a trigger for increased familiarity. Moreover, if the user's location and location history is known, an extended period of activity for a similar location can be used to infer a level of familiarity.

The suitability factors can also include the length of the route, route complexity and route characteristics. Abbreviated directions usually are suitable for routes of a moderate length and complexity. A route that is too simple or short has little to gain from abbreviation, while a route that is too complex or long may not be suitable for abbreviation due to the fact that loss of details may lead to user confusion.

The factors can also include characteristics of the specified starting location, ending location and waypoint location(s). A significant percentage of all directions requested on a typical on-line mapping service have an extended entity for the starting location or the ending location. An extended entity can be defined as data (or an identifier) used to identify a geographical region and which is commonly known and/or readily ascertainable, such as a zip code or city name. However, it is unlikely that the user wants to start or end a route at the centroid of an extended entity in that the centroid could be at an unfamiliar location associated with that region. Instead, it is more likely that the user is familiar with the region and chooses that input as a short cut, and then ignore part of the directions. The presence of such an extended entity as a starting or ending location is a clue to the system that abbreviation around the extended entity is more suitable than a traditional route to the centroid of such an object. Note that the definition of an extended entity can vary across a region and culture.

These factors, and potentially other factors, can be used separately or together to determine if an abbreviated direction set will be generated and whether the abbreviated set is to be shown as the default presentation. In the case where a default presentation is warranted, a determination is made as to which part of the route will be abbreviated. In a specific implementation, the generation of abbreviated direction(s) can be determined by the local transportation topology and route characteristics, whether the default abbreviated presentation is dependent on inferences related to the user's familiarity and/or characteristics of the start/end/waypoint.

Figure 5:
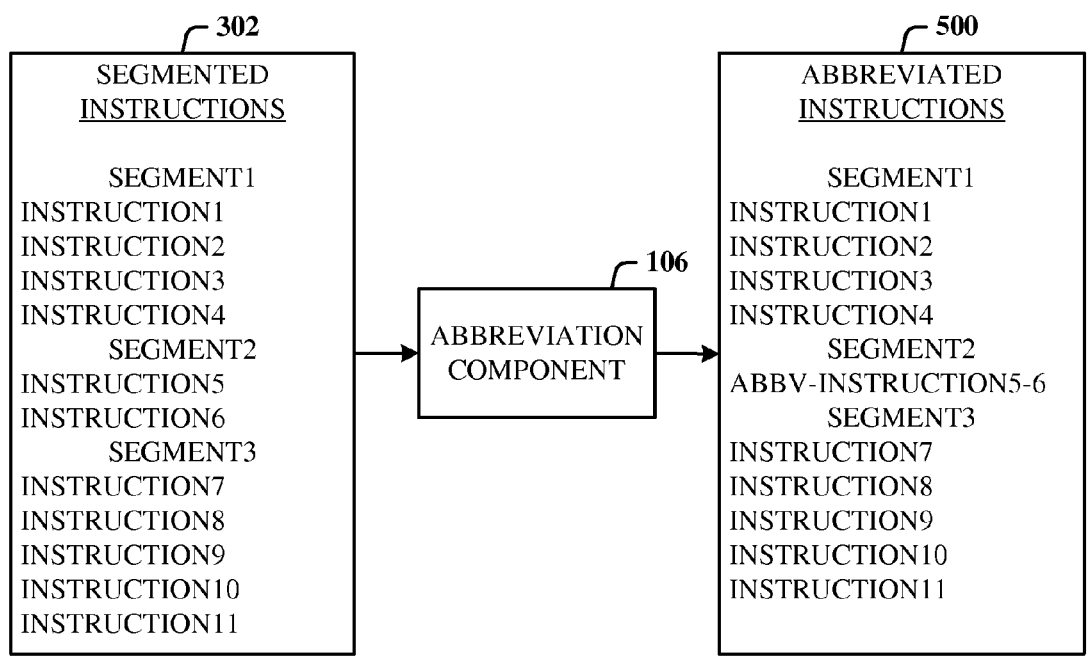
FIG. 5 illustrates the abbreviation of segmented instructions of FIG. 3 into an abbreviated instruction set.

FIG. 5 illustrates the abbreviation of segmented instructions 302 of FIG. 3 into an abbreviated instruction set 500. Here, the abbreviation component 106, based on processes of the decision component, abbreviates the two instructions (ABBV-INSTRUCTION5-6) of the middle segment (Segment2) based on user familiarity with the region. This provides a reduced listing of directions for navigating the route over which the user has an increased sense of familiarity with the region.

Once a route has been successfully segmented, different sets of abbreviated directions may be generated which abstract one or more segments into a condensed format. Different combinations of instructions can be generated to optimize for specific user scenarios. For an exemplary three-segment route abbreviation, possibilities include the following.

| Abbreviation type | Routes for which segmentation is suited | Abbreviated sections | Sample Text |
| --- | --- | --- | --- |
| End only | Routes of moderate length/complexity where the user is familiar with the start and the overall area, or the starting location is an extended entity. | Start and middle | From [start], take [$1^{st}$ major roadway in middle], [$2^{nd}$ major roadway in middle] . . . to [last major roadway in middle]. |
| Start only | Routes of moderate length/complexity where the user is familiar with the end and the overall area, or the ending location is an extended entity. | Middle and end | Take [1st major roadway in middle], [$2^{nd}$ major roadway in middle] . . . [last major roadway in middle] to [destination] |
| Middle only | Routes of moderate or long length and moderate complexity where the user is familiar with the start and end areas, or the starting and ending location is an extended entity. | Start and End | From [start], proceed to [$1^{st}$ major roadway of middle] From [last major road way of middle], proceed to [destination] |
| Abbreviated | Routes of long length, higher | Start | From [start], proceed to |

-continued

| Abbreviation type | Routes for which segmentation is suited | Abbreviated sections | Sample Text |
|---|---|---|---|
| start | complexity where the user is familiar with the start, or the starting location is an extended entity. | | [1$^{st}$ major roadway of middle] |
| Abbreviated end | Routes of long length, higher complexity where the user is familiar with the end, or the ending location is an extended entity. | End | From [last major road way of middle], proceed to [destination] |

Abbreviated directions can be generated for routes which can be successfully segmented according to the criteria suitable for that transportation environment. However, it is not always the case that the route is presented as the default route in the user interface. Presentation selection can depend on other factors such as route complexity, user perceived familiarity level and the characteristics of the start/end/waypoints.

Assuming that abbreviated instructions can be obtained, the route can be presented as the default route if the starting and/or ending locations are an extended entity that users typically do not care to start/end at the centroid of a geographic location. The route can also be the default presentation if the system computes a high probability that the user is familiar with a particular segment of the route. In any case, the selection of abbreviated directions is available to users of the system once the default presentation is shown so the users can choose to alter the presentation to a specific use case, if desired.

Figure 6:
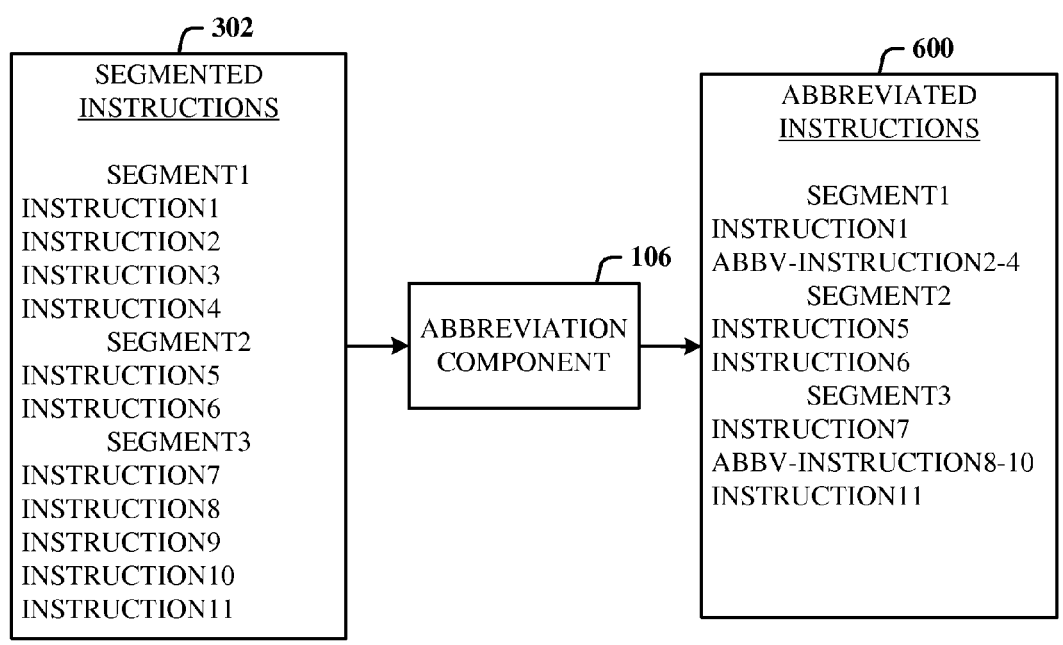
FIG. 6 illustrates an alternative abbreviation of segmented instructions of FIG. 3 into an abbreviated instruction set at a greater granularity.

FIG. 6 illustrates an alternative abbreviation of segmented instructions 302 of FIG. 3 into an abbreviated instruction set 600 at a greater granularity. Here, the abbreviation component 106, based on processes of the decision component, for example, abbreviates three instructions (ABBV-INSTRUCTION2-4) of the starting segment (Segment1) based on user familiarity with the region and three instructions (ABBV-INSTRUCTION8-10) of the ending segment (Segment3) also based on user familiarity with the region, for example. This provides a reduced listing of directions for navigating the route over which the user has an increased sense of familiarity with the region.

Once a route has been successfully segmented, different sets of abbreviated directions may be generated which abstract one or more segments into a condensed format. Different combinations of instructions can be generated to optimize for specific user scenarios.

Figure 7:
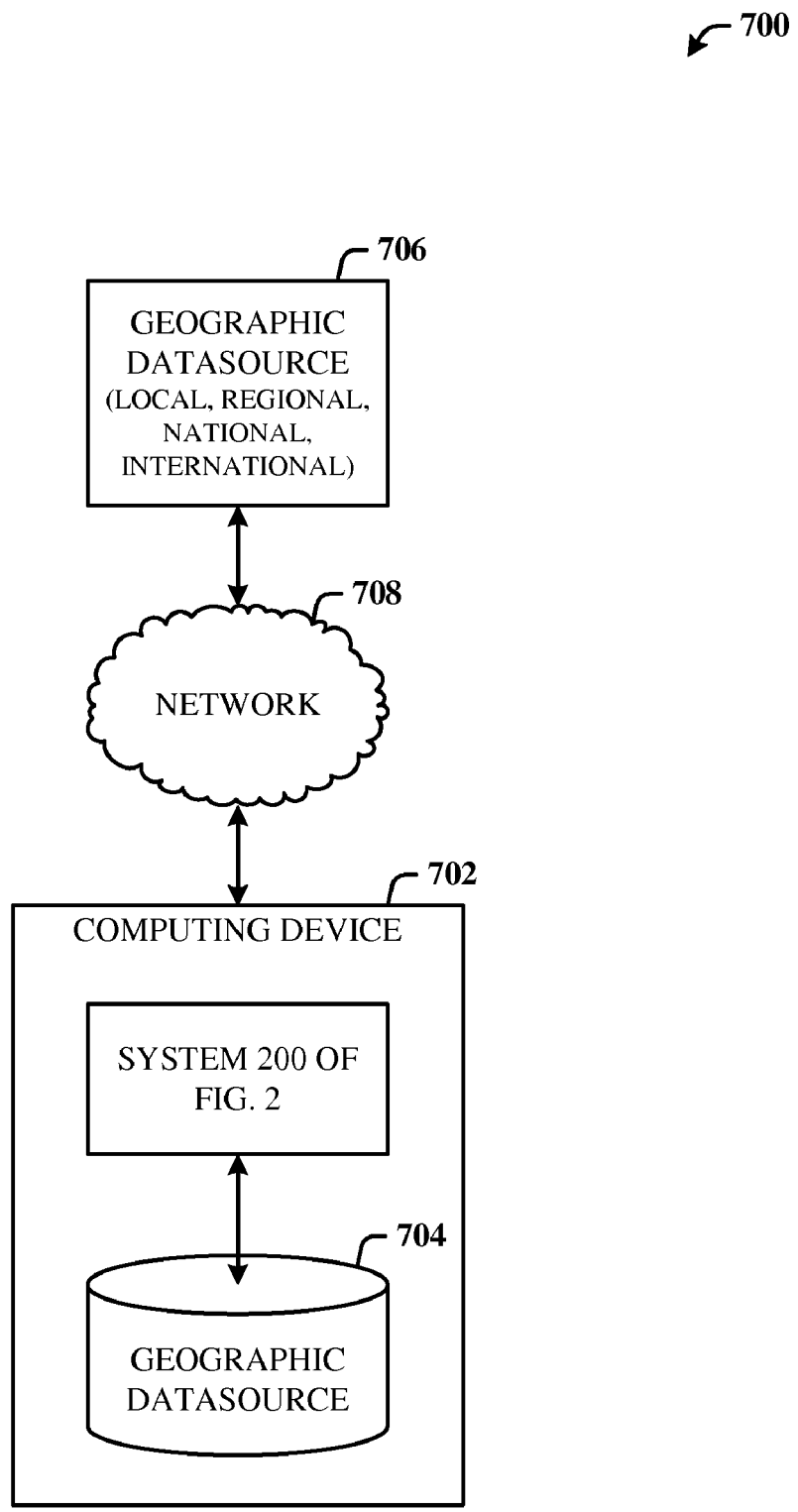
FIG. 7 illustrates a system that facilitates the computation of abbreviated instructions based on online and/or offline sources of information.

FIG. 7 illustrates a system 700 that facilitates the computation of abbreviated instructions based on online and/or offline sources of information. The system 700 includes a computing device 702 (e.g., portable computer, smart phone, etc.) that includes the system 200 of FIG. 2 for segmenting instructions (directions), deciding whether to abbreviate one or more segments or instructions thereof, abbreviating instructions, and then presenting the results to a user. The information from which to obtain the route navigational directions can be a local geographic datasource 704 (e.g., a CDROM) and/or from an online datasource 706 accessible over a network 708 (e.g., the Internet, cellular provider, etc.). Either or both of the local datasource 704 or/and online datasource 706 can include local, regional, national and international geographic data for processing to result in the abbreviated segments and/or instructions.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
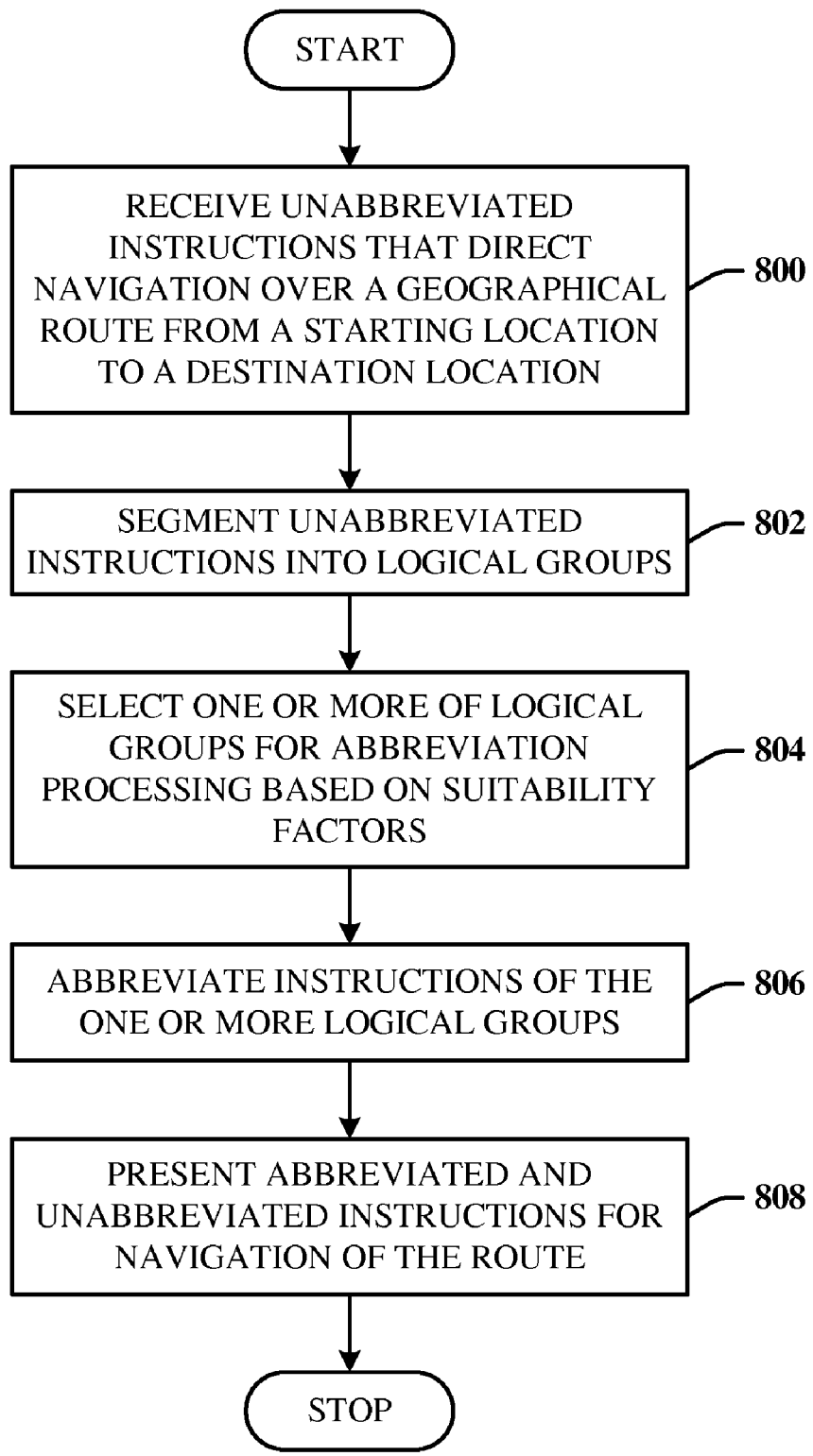
FIG. 8 illustrates a computer-implemented method of providing navigational instructions.

FIG. 8 illustrates a computer-implemented method of providing navigational instructions. At 800, unabbreviated instructions are received that direct navigation over a geographical route from a starting location to a destination location. At 802, the unabbreviated instructions are segmented into logical groups. At 804, one or more of the logical groups are selected for abbreviation processing based on suitability factors. At 806, the instructions of the one or more logical groups are abbreviated. At 808, the abbreviated and unabbreviated instructions are presented for navigation of the route.

Figure 9:
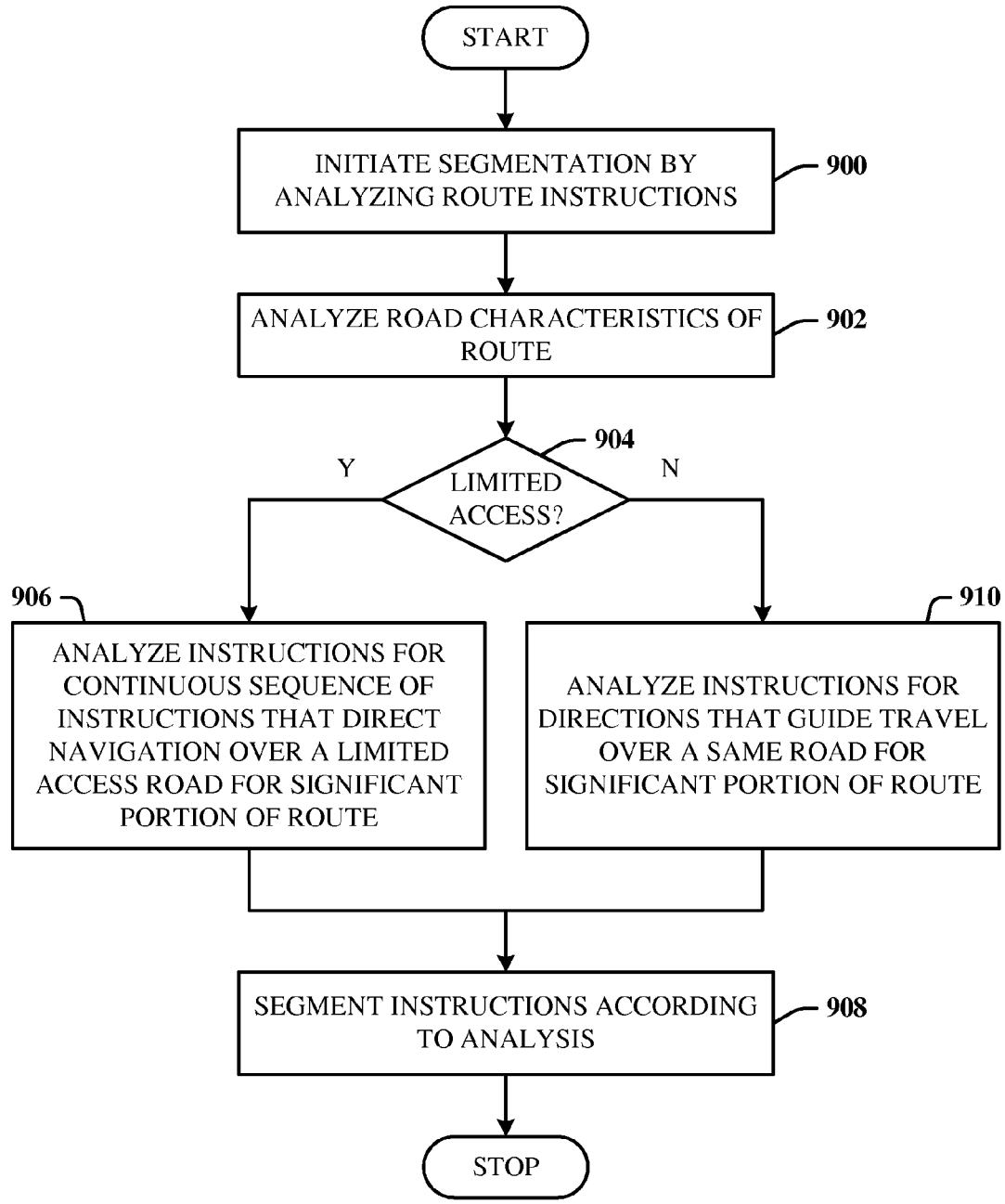
FIG. 9 illustrates a method of segmenting navigational instructions for abbreviation.

FIG. 9 illustrates a method of segmenting navigational instructions for abbreviation. At 900, segmentation is initiated by analyzing route instructions. At 902, road characteristics of the route are analyzed. At 904, the system performs limited-access analysis, and at 906, the instructions are analyzed for a continuous sequence of instructions that direct navigation over a limited access road for a significant portion of the route. At 908, the instructions are segmented according to the resulting analysis. Alternatively, at 904, if not processing for limited access, the instructions are analyzed for directions that guide travel over the same road for a significant portion of the route, as indicated at 910. Flow is then to 908 where the instructions are segmented according to the resulting analysis.

Figure 10:
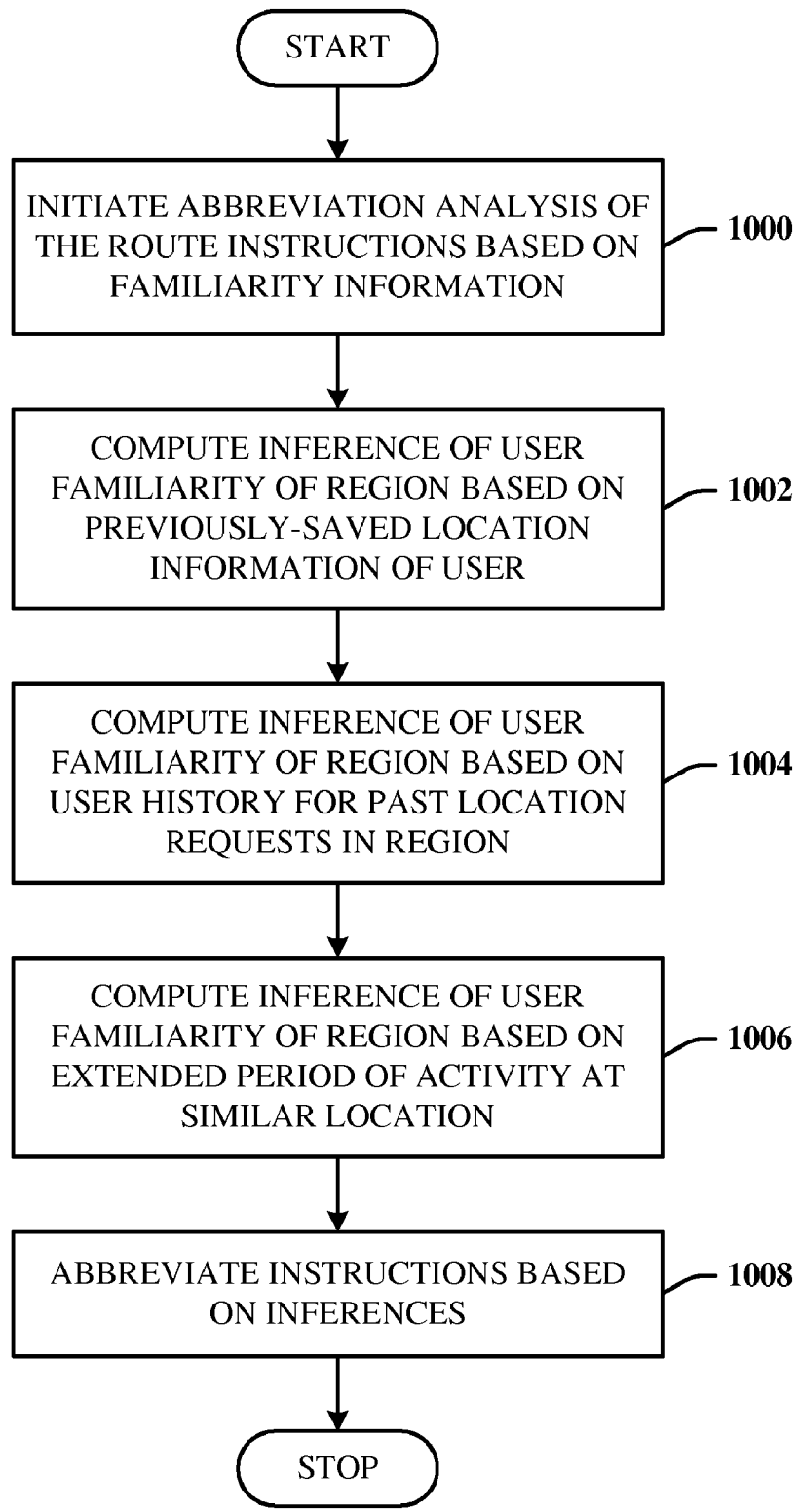
FIG. 10 illustrates a method of abbreviating route instructions based on inferences of user familiarity with a region.

FIG. 10 illustrates a method of abbreviating route instructions based on inferences of user familiarity with a region. At 1000, abbreviation analysis of the route instructions is initiated based on user familiarity information. At 1002, an inference of user familiarity of the region is computed based on previously-saved location information by the user. At 1004, an inference of user familiarity of the region is computed based on user history for past requests for location information in the region. At 1006, an inference of user familiarity of the region is computed based on an extended period of activity at a similar location in the region. At 1008, one or more instructions are abbreviated based on the inferences.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
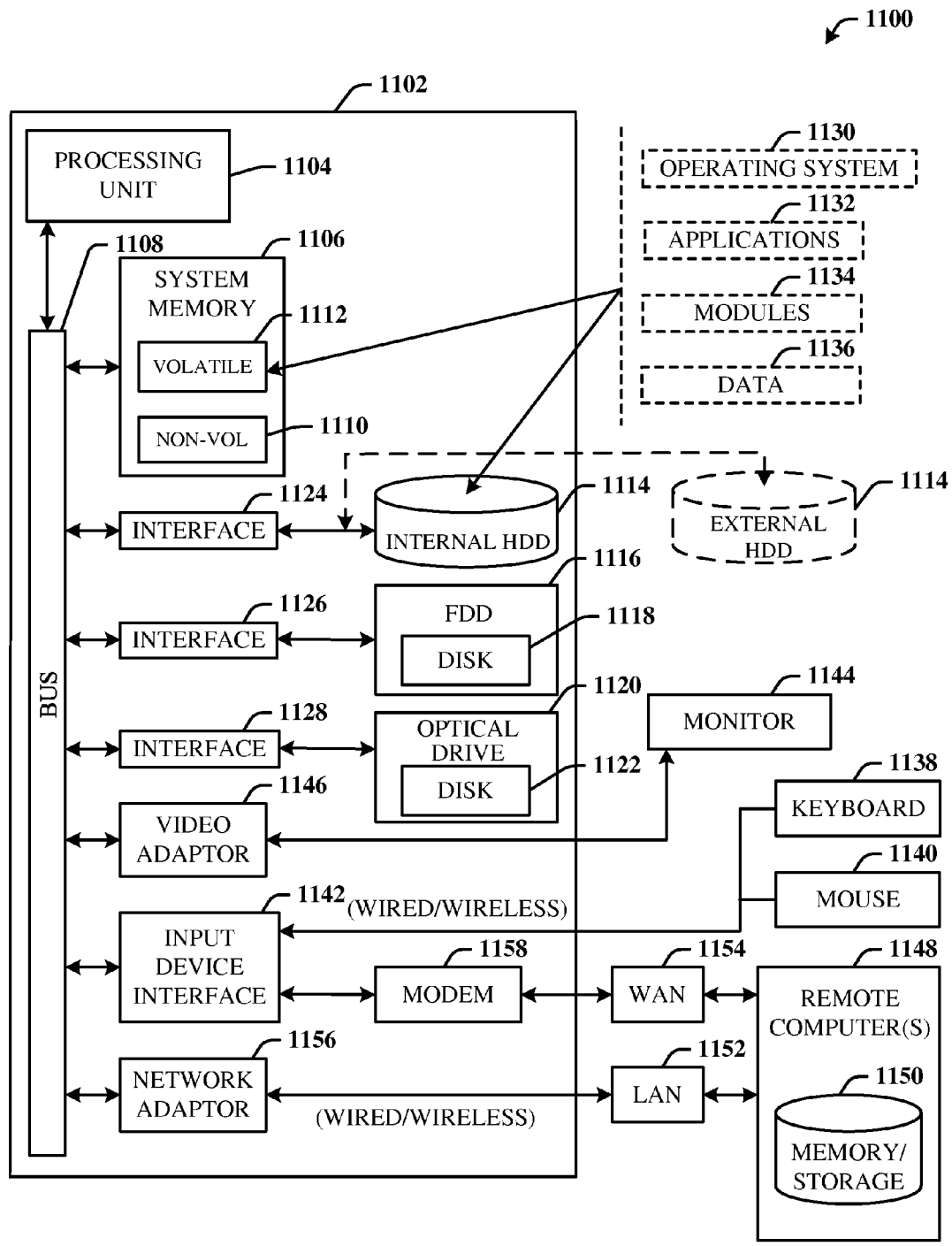
FIG. 11 illustrates a block diagram of a computing system operable to execute instruction abbreviation processing in accordance with the disclosed architecture.

Referring now to FIG. 11, there is illustrated a block diagram of a computing system 1100 operable to execute instruction abbreviation processing in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS stores the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. The one or more application programs 1132, other program modules 1134, and program data 1136 can include the segmentation component 102, decision component 104, abbreviation component 106, presentation component 202, the instruction generation component 204, endpoint information, the unabbreviated and abbreviated route instructions (directions), and the geographic datasource 704. The computing systems (100 and 200) can be the computing device 702 or a server that operates on the network-based geographic datasource 706, for example.

All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented navigation system, comprising:
    a segmentation component for grouping instructions into multiple segments, the instructions providing a route for navigating geographically from a starting location to an ending location;
    a decision component for processing one or more factors to determine suitability for abbreviating the instructions of the one or more of the segments; and
    an abbreviation component for abbreviating the instructions of the one or more segments based on the one or more factors.

2. The system of claim 1, further comprising a presentation component for presenting strings that represent the abbreviated instructions and controls that allow optimization of a user experience.

3. The system of claim 2, wherein the presentation component presents the abbreviated instructions as a default when the starting location and/or the ending location are an extended entity.

4. The system of claim 1, wherein the multiple segments include a start segment, end segment, and one or more middle segments.

5. The system of claim 1, wherein the factors include a local transportation topology that comprises mode of transport, locality, and culture.

6. The system of claim 1, wherein the factors include familiarity with an area by a user navigating from the start location to the ending location.

7. The system of claim 1, wherein the factors include characteristics of the route, route complexity, and route length.

8. The system of claim 1, wherein the factors include characteristics of the starting location, ending location, and waypoint locations.

9. The system of claim 1, wherein the instructions are grouped based on a logical type of transportation system.

10. The system of claim 1, wherein the starting location or the ending location is an extended entity.

11. A computer-implemented method of providing navigational instructions, comprising:
    receiving unabbreviated instructions that direct navigation over a geographical route from a starting location to a destination location;
    segmenting the unabbreviated instructions into logical groups;
    selecting one or more of the logical groups for abbreviation processing based on suitability factors; and
    abbreviating the instructions of the one or more logical groups.

12. The method of claim 11, further comprising presenting the abbreviated instructions and unabbreviated instructions for navigation of the route.

13. The method of claim 11, further comprising identifying a middle logical group based on a continuous sequence of instructions that direct navigation over a limited-access road for a portion of the route.

14. The method of claim 11, further comprising identifying a middle logical group based on instruction that direct navigation over a same road for a portion of the route.

15. The method of claim 11, further comprising defaulting to presentation of the abbreviated instructions when the starting location or the destination location is an extended entity.

16. The method of claim 11, further comprising defaulting to presentation of the abbreviated instructions based on a computed probability that a user is familiar with a portion of the route.

17. The method of claim 11, further comprising altering a default presentation of abbreviated instructions based on a specific instance of route navigation.

18. The method of claim 11, further comprising abbreviating the instructions based on an inference of a level of user familiarity with a region based on user location and location history.

19. The method of claim 11, further comprising abbreviating the instructions based on an inference of familiarity with a region by a user related to previously-saved location information by the user.

20. A computer-implemented system, comprising:
computer-implemented means for receiving unabbreviated instructions that direct navigation over a geographical route from a starting location to a destination location;
computer-implemented means for segmenting the unabbreviated instructions into logical groups;
computer-implemented means for selecting one or more of the logical groups for abbreviation processing based on suitability factors; and
computer-implemented means for abbreviating the instructions of the one or more logical groups.

* * * * *